Oct. 12, 1965   J. H. HUMISTON   3,210,820
ONE-WAY SNAP FASTENER COMBINATION
Filed May 26, 1964
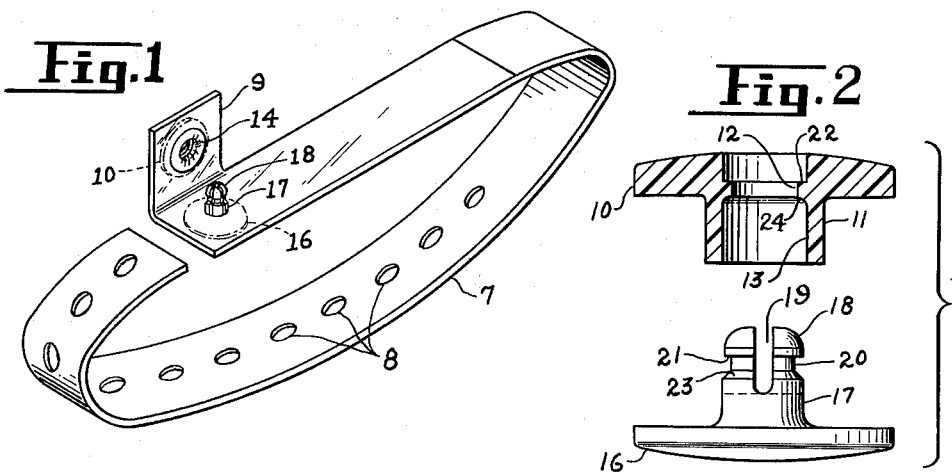
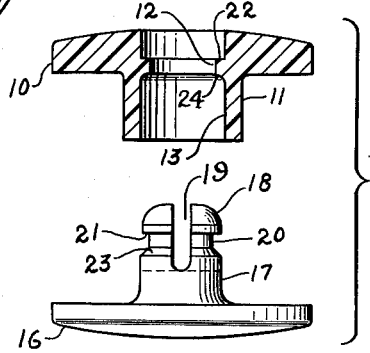
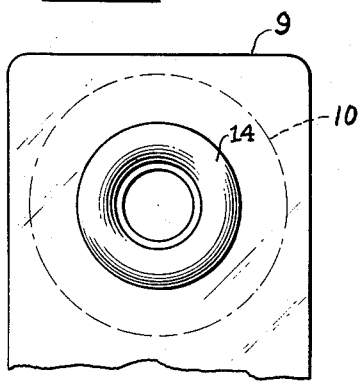
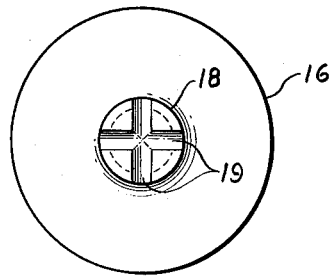
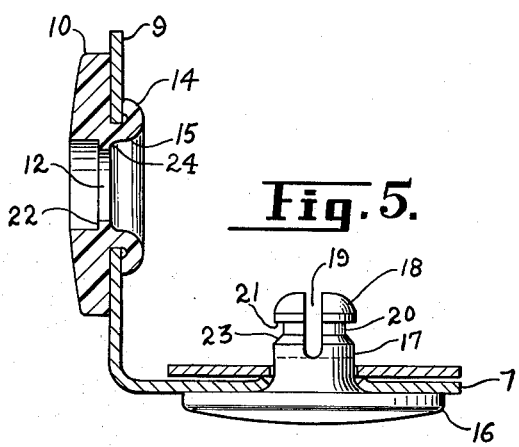
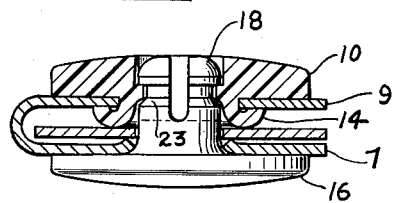
INVENTOR.
John H. Humiston.
BY
H. F. Johnston.

3,210,820
ONE-WAY SNAP FASTENER COMBINATION
John H. Humiston, Watertown, Conn., assignor to Scovill Manufacturing Company, Waterbury, Conn., a corporation of Connecticut
Filed May 26, 1964, Ser. No. 370,229
2 Claims. (Cl. 24—208)

My invention relates to what may be termed a one-way snap fastener, which means a fastener which will be permanently locked once the two parts are snapped together.

It is intended to secure together in overlapping relation two parts which are intended to be permanently held in place or sealed. It is especially useful for identification bracelets used in hospitals.

An object of the invention is to provide an improved construction for such fasteners where the socket and stud elements each consist of a one-piece plastic part capable of being easily attached to straps or the like and which after being interengaged will provide maximum security against separation.

A more specific object is to provide a socket member which can be secured to its supporting part by rolling over the barrel-like portion which provides a smooth interior lead-in surface and at the same time, wherein the active part which engages with the stud does not depend on this forming operation so that it can be properly and accurately shaped and dimensioned.

Another object is to provide a fastener of the type described wherein an internal rib on the socket will be caught in a relatively narrow neck of the stud so that movement of the parts in either direction is prevented, thus affording maximum security against separation.

In the accompanying drawing, I have shown for the purposes of illustration, one embodiment which the invention may assume in practice. In the drawings:

FIG. 1 is a perspective view of a bracelet equipped with my improved fastener;

FIG. 2 shows the two parts of the fastener before assembly to the strap with the socket shown in section;

FIG. 3 is a plan view of the inner side of the stud element;

FIG. 4 is a plan view of the inner side of the socket element when assembled to a supporting part;

FIG. 5 shows the two parts assembled to a strap with the socket again shown in section; and FIG. 6 is a view similar to FIG. 5 except that the fastener parts are permanently locked together.

The identification bracelet shown in FIG. 1 is a flexible plastic strap 7 with a series of holes 8 near one end. At the other end, is a tab 9 to which the socket element of my improved fastener is attached, the stud element being secured to the strap and in alignment with the socket element.

The socket as seen in FIG. 2 is a one-piece rigid plastic molding having an annular base 10, a tubular cylindrical portion 11 and an internal rib 12 which extends entirely around the inner surface of the axial opening 13 which extends entirely through the socket element.

In assembling the socket member to the strap, the cylindrical portion 11 is pushed through a hole and upset outwardly and against the inner surface of the strap in the form of a bead 14 and providing a smooth rounded lead-in surface 15 to enable the stud element to be guided more easily into place.

The stud is also a one-piece plastic molding comprising a base flange 16 adapted to bear against the outer surface of its supporting piece, and a post 17 which is placed through one of the holes 8 depending on the size of the bracelet desired. This post has a rounded head portion 18, and one or more slots 19 extend through the end of the post to a depth beyond the neck 20. This neck provides a square or abrupt shoulder 21 facing outwardly toward the base flange 16, and when the parts are pressed together as seen in FIG. 6, the slotted stud head will yield enough to allow this shoulder 21 to pass over the rib 12 and snap back into permanent engagement with the outwardly facing square shoulder 22 provided by the rib 12.

The narrow neck 20 also leaves a beveled shoulder 23 facing away from the base flange 16 which abuts against the inwardly facing surface 24 of the rib 12 so as to limit the movement of the stud into the socket. This prevents further relative inward movement and provides for more security.

What I claim is:

1. In combination with two parts adapted to be secured together in overlapping relation, a one-way snap fastener construction comprising
    (a) a one-piece rigid socket of plastic material with an axial opening therethrough, said socket having an annular base bearing against the outer surface of one of said overlapping parts and a tubular cylindrical portion projecting through such part and upset outwardly and against the inner surface of such overlapping part and providing an annulus with a smooth rounded interior lead-in surface, said socket having an uninterrupted rib directed toward the center of said opening and spaced from the outer surface of said base and also from said annulus, said rib providing an abrupt shoulder facing outwardly; and
    (b) a one-piece plastic stud comprising a base flange post having a reduced neck intermediate its end and providing an abrupt shoulder facing toward the base flange, said post having at least one cross slot extending into the free end of said post through the neck portion thereof, said post projecting through the other of said overlapping parts and into said socket whereby said abrupt shoulder of said stud will engage over said abrupt shoulder of said socket in permanent interlocked engagement.

2. The combination defined in claim 1 wherein said reduced neck of the stud post provides a shoulder facing away from said base flange which co-operates with the inner surface of said uninterrupted rib to limit movement of said stud post into said socket opening.

References Cited by the Examiner
UNITED STATES PATENTS

| | | | |
|---|---|---|---|
| 360,913 | 4/87 | Pringle | 24—208 |
| 2,610,879 | 9/52 | Pope | 24—214 |
| 2,871,592 | 2/59 | Polzin | 24—206 |

References Cited by the Applicant
UNITED STATES PATENTS

| | | |
|---|---|---|
| 502,560 | 8/93 | Gleason. |
| 829,837 | 8/06 | Brisacher. |
| 2,896,889 | 7/59 | Hershberger. |
| 2,971,681 | 2/61 | Galbierz. |
| 3,015,869 | 1/62 | Rapata. |

DONLEY J. STOCKING, *Primary Examiner.*
BERNARD A. GELAK, *Examiner.*